United States Patent
Chandramouli et al.

(10) Patent No.: US 8,699,430 B2
(45) Date of Patent: Apr. 15, 2014

(54) METHOD AND APPARATUS FOR DYNAMIC SPECTRUM ACCESS

(75) Inventors: Rajarathnam Chandramouli, Holmdel, NJ (US); Shamik Sengupta, Jersey City, NJ (US); Kai Hong, Jersey City, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 1166 days.

(21) Appl. No.: 12/576,849

(22) Filed: Oct. 9, 2009

(65) Prior Publication Data

US 2010/0135226 A1 Jun. 3, 2010

Related U.S. Application Data

(60) Provisional application No. 61/104,361, filed on Oct. 10, 2008.

(51) Int. Cl.
*H04W 4/00* (2009.01)
*H04J 1/16* (2006.01)

(52) U.S. Cl.
USPC .......................................... 370/329; 370/252

(58) Field of Classification Search
USPC ................. 370/252, 310–350, 431, 464–465
See application file for complete search history.

(56) References Cited

U.S. PATENT DOCUMENTS

| | | | |
|---|---|---|---|
| 6,614,768 B1 | 9/2003 | Mahany et al. | |
| 7,224,697 B2 * | 5/2007 | Banerjea et al. | 370/401 |
| 7,558,229 B2 * | 7/2009 | Bachl et al. | 370/313 |
| 7,643,247 B2 | 1/2010 | Kokku et al. | |
| 7,710,919 B2 * | 5/2010 | Woo et al. | 370/329 |
| 7,787,393 B2 * | 8/2010 | Fallon et al. | 370/252 |
| 7,839,788 B2 | 11/2010 | Qi | |
| 7,912,002 B2 * | 3/2011 | Gaur | 370/329 |
| 8,391,135 B1 * | 3/2013 | Kuhn | 370/227 |
| 8,503,383 B2 * | 8/2013 | Hu et al. | 370/329 |
| 8,509,159 B2 * | 8/2013 | Shao et al. | 370/329 |
| 8,516,096 B2 | 8/2013 | LeBlanc et al. | |
| 2003/0108034 A1 | 6/2003 | Yu | |
| 2004/0152429 A1 | 8/2004 | Haub et al. | |
| 2004/0203820 A1 * | 10/2004 | Billhartz | 455/452.1 |
| 2004/0236547 A1 * | 11/2004 | Rappaport et al. | 703/2 |
| 2007/0101133 A1 | 5/2007 | Liu et al. | |
| 2007/0268862 A1 * | 11/2007 | Singh et al. | 370/329 |
| 2008/0151893 A1 | 6/2008 | Nordmark et al. | |
| 2008/0192686 A1 * | 8/2008 | Cho et al. | 370/329 |
| 2009/0252095 A1 * | 10/2009 | Lu et al. | 370/329 |
| 2009/0296737 A1 | 12/2009 | Arye | |
| 2010/0008291 A1 | 1/2010 | LeBlanc et al. | |
| 2010/0232380 A1 * | 9/2010 | Choi et al. | 370/329 |

(Continued)

OTHER PUBLICATIONS

Written Opinion of International Searching Authority, mailed Jan. 11, 2011, issued in related International Patent Application No. PCT/US2010/048958.

(Continued)

*Primary Examiner* — Warner Wong
(74) *Attorney, Agent, or Firm* — Greenberg Traurig, LLP

(57) ABSTRACT

Methods and apparatus are provided for the efficient use of cognitive radios in the performance of dynamic spectrum access. This includes spectrum sensing algorithms, adaptive optimized sensing of parameters based on changing radio environments, and identifying vacant channels. Protocols for switching communication links to different channels, and synchronizing communicating nodes in order to maintain reliable connectively while maximizing spectrum usage are also provided.

18 Claims, 12 Drawing Sheets

(56) References Cited

U.S. PATENT DOCUMENTS

| | | | |
|---|---|---|---|
| 2010/0238868 A1* | 9/2010 | Melpignano et al. | 370/329 |
| 2011/0032892 A1* | 2/2011 | Bahl et al. | 370/329 |
| 2011/0090853 A1 | 4/2011 | Chandramouli et al. | |
| 2011/0164518 A1 | 7/2011 | Daraiseh et al. | |
| 2011/0185053 A1 | 7/2011 | Larson et al. | |

OTHER PUBLICATIONS

International Search Report of International Searching Authority, mailed Jan. 11, 2011, issued in related International Patent Application No. PCT/US2010/048958.

U.S. Appl. No. 12/882,831, entitled "Method and Apparatus for Dynamic Spectrum Access", filed Sep. 15, 2010.

Buddhikot, M. et al., "DIMSUMnet: New Directions in Wireless Networking Using Coordinated Dynamic Spectrum Access", IEEE International Symposium on a World of Wireless, Mobile and Multimedia Networks, 2005, pp. 78-85.

Choi, N. et al., "A Full Duplex Multi-Channel MAC Protocol for Multi-hop Cognitive Radio Networks", $1^{st}$ International Conference on Cognitive Radio Oriented Wireless Networks and Communications, Jun. 8-10, 2006, pp. 1-5.

Cordeiro, C. et al., "C-MAC: A Cognitive MAC Protocol for Multi-Channel Wireless Networks", $2^{nd}$ IEEE International Symposium on New Frontiers in Dynamic Spectrum Access Networks (DySPAN), Apr. 17-20, 2007, pp. 147-157.

Harada, H. et al., "Software Defined Cognitive Radio Prototype toward IMT-Advanced Wireless Communication Systems", IEEE $18^{th}$ International Symposium on Personal, Indoor and Mobile Radio Communications (PIMRC), Sep. 3-7, 2007, pp. 7-10.

Lee, B. et al., "Adaptive MAC Protocol for Throughput Enhancement in Cognitive Radio Networks", International Conference on Information Networking (ICOIN), Jan. 23-25, 2008, pp. 1-5.

Ma, L. et al., "Dynamic Open Spectrum Sharing MAC Protocol for Wireless Ad Hoc Networks", in IEEE DySPAN, Nov. 2005, pp. 203-213.

Kim, H. et al., "An Experimental Approach to Spectrum Sensing in Cognitive Radio Networks with Off-the-Shelf IEEE 802.11 Devices", $4^{th}$ IEEE Consumer Communications and Networking Conference (CCNC), Jan. 11-13, 2007, pp. 1154-1158.

Su, H. et al., "Cross-Layer Based Opportunistic MAC Protocols for QoS Provisionings Over Cognitive Radio Wireless Networks", IEEE Journal on Selected Areas in Communications, vol. 26, Issue 1, Jan. 2008, pp. 118-129.

Yuan Y. et al., "KNOWS: Cognitive Radio Networks Over White Spaces", 2nd IEEE International Symposium on New Frontiers in Dynamic Spectrum Access Networks (DySPAN), Apr. 17-20, 2007, pp. 416-427.

Zhao, Q. et al., "Decentralized Cognitive MAC for Dynamic Spectrum Access", in IEEE DySPAN, Nov. 2005.

Federal Communications Commission (FCC), "Notice of Proposed Rule Making", May 2004.

McHenry M. et al., "New York City Spectrum Occupancy Measurements Sep. 2004", Shared Spectrum Company, Dec. 15, 2004, pp. 1-95.

Examination Report issued Dec. 24, 2012 in connection with UK Patent Application No. GB1206502.5.

First Action Interview Pilot Program Pre-Interview Communication issued in connection with U.S. Appl. No. 12/882,831 (9 pages).

* cited by examiner

METHOD AND APPARATUS FOR DYNAMIC SPECTRUM ACCESS

CROSS-REFERENCE TO RELATED APPLICATIONS

The present application claims the benefit of U.S. Provisional Patent Application Ser. No. 61/104,361, filed on Oct. 10, 2008, the disclosure of which is incorporated herein by reference in its entirety.

STATEMENT REGARDING FEDERALLY SPONSORED RESEARCH

Some of the research performed in the development of the disclosed subject matter was supported by U.S. Grant No. 2007-IJ-CX-K020 from the National Institute of Justice. The U.S. government may have certain rights with respect to this application.

FIELD OF THE INVENTION

The present invention relates to a device and method for spectrum access in wireless networks, and, more particularly, to a device and method for dynamic spectrum access in wireless networks.

BACKGROUND OF THE INVENTION

With recent proliferation in wireless services and amplification in number of end-users, wireless industry is fast moving toward a new wireless networking model where wireless service providers are finding it difficult to satisfy users and increase revenue with just the spectrum statically allocated. Spectrum usage being both space and time dependent, a static allocation often leads to low spectrum utilization and "artificial scarcity" of spectrum resulting in significant amount of "white space" (unused band) available in several spectral bands that could be exploited by both licensed and unlicensed services. For example, the extent of this white space was measured in New York City during the 2004 Republic National Convention.

In order to break away from the inflexibility and inefficiencies of static spectrum allocation, the new concept of Dynamic Spectrum Access (DSA) is being investigated by network and radio engineers, policy makers, and economists. In DSA, spectrum will be opportunistically accessed dynamically by end-users in a time and space variant manner. Emerging wireless technologies such as cognitive radios, which sense the operating environment and adapts itself to maximize performance, is anticipated to make DSA a reality.

In November of 2004, FCC passed an important resolution entitled NPRM 04-186[11]. In NPRM 04-186, FCC defined provisions that allow unlicensed devices (secondary users) to operate in the licensed bands (primary bands) opportunistically so long as the unlicensed devices avoid licensed services (primary incumbents) who are the primary owners of these bands. Thus for unlicensed devices to gain access to this opportunistic spectrum access, FCC requires that the unlicensed devices operating on a primary band, upon arrival of primary user(s) on this particular primary band, must stop secondary communication within a certain time threshold T (the value of T may vary depending on the nature of licensed services), and switch to a new unused band.

With such requirements for dynamic spectrum access, Cognitive Radio (CR) is seen as a key concept solution to meet FCC's policy and to build future generation of wireless networks. A cognitive radio must periodically perform spectrum sensing and operate at any unused frequency in the licensed or unlicensed band, regardless of whether the frequency is assigned to licensed services or not. But the most important regulatory aspect is that cognitive radios must not interfere with the operation in some licensed band and must identify and avoid such bands in a timely manner. Cognitive radio enabled secondary devices operating on some primary band(s) upon detecting primary incumbents in that band(s) must automatically switch to another channel or mode within a certain time threshold. Thus accurate sensing/detection of arrival of primary incumbents and hence switching (moving) to some other channel are two of the most important challenging tasks in cognitive radio network.

Thus the basic operating principle of cognitive radio relies on a radio being able to sense whether a particular band is being used and, if not, to utilize the spectrum. Cognitive radios can be viewed as an electromagnetic spectrum detector, which can find an unoccupied band and adapt the carrier to that band. The layer functionalities of cognitive radios can be separated into the physical (PHY) and the medium access control (MAC) layer. The physical layer includes sensing (scanning the frequency spectrum and process wideband signal), cognition (detecting the signal through energy detector), and adaptation (optimizing the frequency spectrum usage such as power, band and modulation). The medium access layer cooperates with the sensing measurement and coordinates in accessing spectrum. The requirement is that whenever cognitive radio detects primary incumbents in the currently operating channel, it must switch to some other channel within certain time T.

However, unlike the existing single frequency radio devices (which operates using only one static frequency); cognitive radio with dynamic spectrum access capability faces several challenges with regard to dynamic frequency switching. When a cognitive radio device moves from one spectrum band to another to comply with the DSA regulation of vacating the old band for licensed devices (if there is any), cognitive radio node must restart the hardware to reset and adapt to the particular transmission or reception parameters in the new spectrum band. This process of hardware resetting configures the cognitive radio MAC accordingly, which introduces delay in the channel switching. Moreover, when two cognitive radio nodes in communication must switch to a new spectrum band, they must successfully synchronize with each other to move to the new channel and resume communication. Note that, in DSA, there is no fixed pre-defined channel for the cognitive radio enabled secondary devices to move to. Thus major challenges for the cognitive radio devices are conveying accurate synchronization messages (available channel information) to each other, dynamic channel switching with minimum switching delay, re-synchronizing with the peer with whom it was earlier communicating and resuming communication as fast as possible in the new channel. In the whole process of frequency switching and re-synchronization, unless some remedial actions are taken, data from upper layers may be lost which would adversely affect the data throughout performance.

Some differences from the existing technology (i.e., static radio devices) are listed below. For instance, in existing implemented technology (e.g., WiFI or WiMAX or similar wireless access technologies), static radio devices are dominant. However, static radio devices have the following disadvantages:

The static radio devices can operate only on a single frequency channel in the entire network The static radio device can not automatically configure itself to switch to other frequency bands even if there are multiple orthogonal frequencies available in the network The static radio must be completely restarted manually for reconfiguration if there is any problem with the current frequency channel In the legacy IEEE 802.11 system, a single wireless card can connect to only one wireless access point (AP) in the infrastructure mode or a single ad hoc network in the ad hoc mode, using only one frequency channel in the entire network even though there are multiple frequency bands available in a IEEE 802.11a/b/g network.

Simultaneous connections to multiple networks are not possible with the static radio device.

SUMMARY OF THE INVENTION

The present invention overcomes the limitations faced by static radio devices by providing methods and apparatus for dynamic spectrum access with the help of cognitive radios. Software driven cognitive radio functionality is implemented by focusing on the two most important regulatory aspects: sensing/detection of primary incumbents and dynamic channel switching upon detection of the primary incumbents.

The design and implementation of the present invention can be successfully deployed on any off-the-shelf wireless access card. The software abstraction hides the physical layer details from the upper layers in the modified network protocol stack as will be described hereinafter. With the programmable hardware abstraction layer, the cognitive radio can configure the transmission/reception parameters automatically to operate at any unused frequency in the allowable spectrum bands unlike the existing radios which can only be configured to operate statically at any one frequency channel.

A goal of the cognitive radio system architecture and design is to operate on any unused spectrum band efficiently with high data throughput; conduct sensing/detection of primary incumbents to comply with the mandatory regulation that cognitive radio must not interfere the primary incumbents; achieve seamless spectrum band switching in dynamic spectrum access networks if primary incumbents are detected in the current operating band. This goal poses several challenges involved with switching (moving) to new channel upon sensing/detection of primary incumbents:

When a wireless card switches (moves) to a new channel, the hardware is reset and the MAC will be restarted. However, this process can induce a delay of the order of 100 ms. This is a significant delay overhead for channel switching where the aim is to switch as fast as possible. Therefore a modified implementation is needed to eliminate this overhead.

When a wireless radio or card switches (moves) to a new channel, it reconfigures the frequency channel. Thus for the duration of switching, it needs to stop the data transmitted from the upper layers. This operation will adversely affect the performance at the higher layers. In order to solve this issue, an extra data buffer is needed to achieve seamless channel switching.

Communicating Cognitive radio transmitter-receiver nodes with dynamic channel switching capability must successfully synchronize with each other prior to the actual dynamic channel switching to move to a new channel and resume communication. Thus proper synchronization between the communicating cognitive radio nodes is a key issue; otherwise the nodes may end up in different channels resulting in the loss of the communication link.

The dynamic frequency switching policy must be simple with a goal towards fast switching, increased robustness, reduced overhead and increased effective throughput.

Some of the challenges involved with sensing/detection of primary incumbents are listed below:

Primary incumbents sensing/detection is one of the most important tasks for cognitive radio to comply with the mandatory regulatory aspect. However, the question is what would be an optimal strategy of sensing/detection. Energy and interference/noise detection can be one way of understanding the presence of other communications; however, mere energy detection can not distinguish between cognitive radio communications and primary incumbents communications.

Moreover, energy detection is more applicable when the cognitive radios are quiet; however a major drawback in making all the cognitive radio nodes quiet is that normal communication is lost for the sensing duration resulting in degraded performance.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE INVENTION

Figure 1:
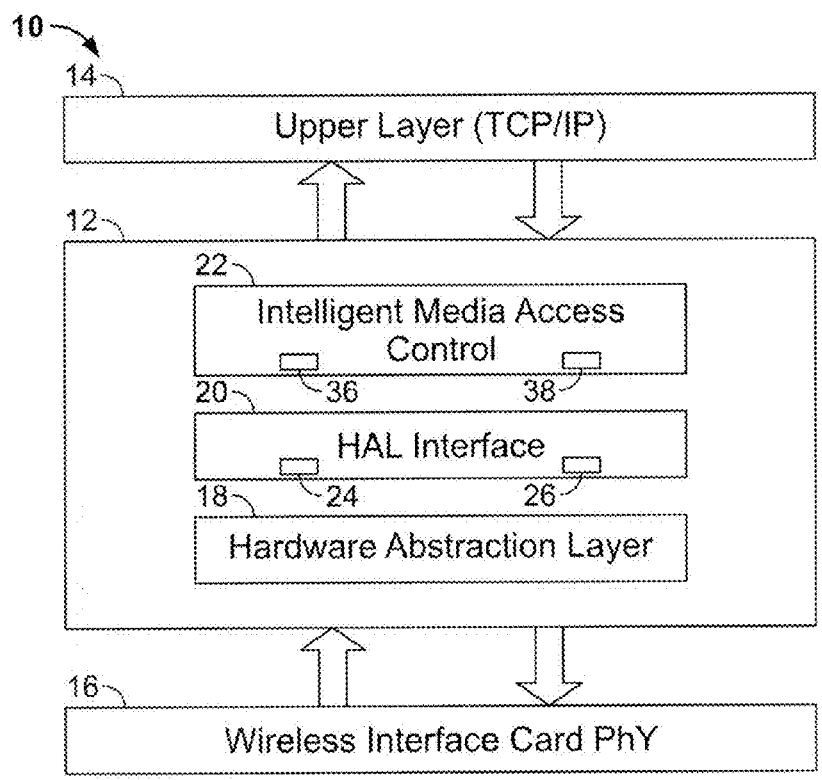
FIG. 1 is a block diagram of the network protocol stack for one embodiment of the present invention.

FIG. 1 illustrates a network protocol stack 10 constructed in accordance with the present invention. The protocol stack 10 includes a MAC layer 12 which is modified from current MAC layer protocol, and upper and physical layers 14, 16 which are not modified from current upper and physical layer protocols. The MAC layer 12 includes modules, processes, and features that optimize operating efficiencies for cognitive radios. Cognitive radios are guided by the MAC layer 12 protocol in efficiently performing spectrum sensing when operating in any unused frequency in the licensed or unlicensed band, and efficiently switching so as not interfere with or enabling co-existence with any incumbent operation in the licensed band. Dynamic spectrum access (i.e., opportunistically accessing the spectrum dynamically) functions performed by cognitive radios are therefore guided by the MAC layer 12. The Mac layer 12 may be deployed in firmware on the wireless access card. More particularly, the MAC layer 12 includes three sublayers: a hardware abstraction (HAL) layer 18, a programmable interface to the hardware abstraction layer or HAL interface layer 20, and an intelligent media access control (IMAC) layer 22. The Mac layer 12 sublayers are discussed below.

Hardware Abstraction Layer

The HAL layer 18 is implemented between the physical hardware of the CR and the controlling software (e.g., protocol) that runs on the CR node processor. Its function is to hide differences in hardware from the controlling software that runs on the CR node processor.

Hardware Abstraction Layer Interface

Special purpose hardware queues such as a synchronization queue (synch queue) 24 and a data buffer queue 26 are implemented in the HAL interface layer 20. These software-only queues create a virtual hardware buffer that helps upper layers 14 buffer the data during channel switching. These queues help in synchronization during channel switching as well as buffer the upper layer 14 data to prevent loss during switching. The synchronization and data buffer queues 24, 26 are discussed in greater detail hereinafter. The HAL Interface 20 is modified to facilitate user access to a modified function described below. The HAL Interface 20 also facilitates cognitive radio software stack developer tests on channel switching, sensing and other protocols.

Intelligent Media Control Layer

Figure 2:
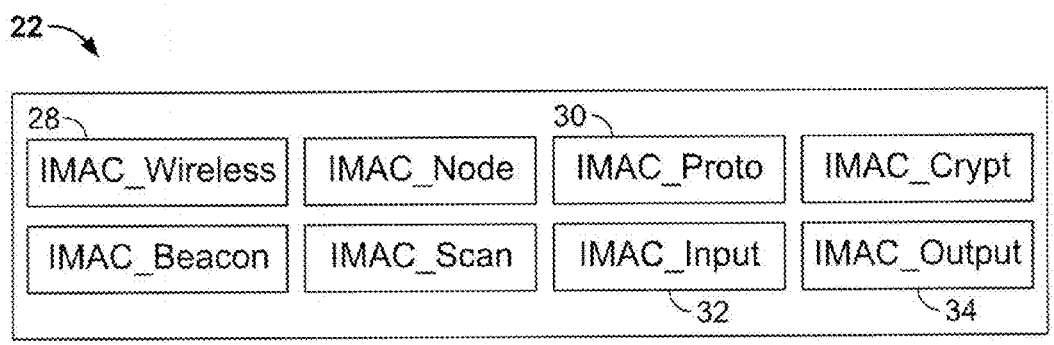
FIG. 2 is block diagram of the function modules of the Intelligent Media Access layer shown in FIG. 1.

Referring to FIG. 2, the IMAC layer 22 is divided into eight different sub-modules. Modifications to the IMac layer 22 protocol (i.e., to support cognitive radios) are provided on four of sub-modules. More particularly, a modified IMAC_wireless module 28, a modified IMAC_proto module 30, a modified IMAC_input module 32, and a modified IMAC_output module 34 are discussed below.

Modified IMAC_Wireless Module

The modified IMAC_wireless module 28 is responsible for command executions from the user space. An extended user space command has been added to the modified IMAC_wireless module 28. Users can send switching signals to the cognitive radio for triggering a switching scheme, via the HAL interface 20. This function is mainly used for testing purposes. With the support of this command, cognitive radio software stack developer can test the channel switching, sensing and other protocols via the HAL interface 20.

Modified IMAC_Proto Module

IMAC_proto module 30 controls processes including timer functions for timeout events. In existing radio protocol, whenever any reconfiguration on any node is done, the node restarts itself and goes into the scan mode, and the neighbor table will be rebuilt (i.e., the bootstrapping process). Under this condition, the process may need more than hundreds of milliseconds. However, in the cognitive radio, due to the automated channel switching function, the node has to reconfigure itself in a short time. In order to solve this issue and make this process as fast as possible, a modified function has been implemented in the IMAC_proto module 30. The modified function includes a dynamic optimized threshold sub-module 36 for efficiently triggering switching, and a destination channel bitmap vector sub-module 38 for efficiently re-synchronizing nodes. Under the IMAC_proto module 30, bootstrapping may take no more than 1 millisecond.

Modified IMAC_Input Module

Figure 3:
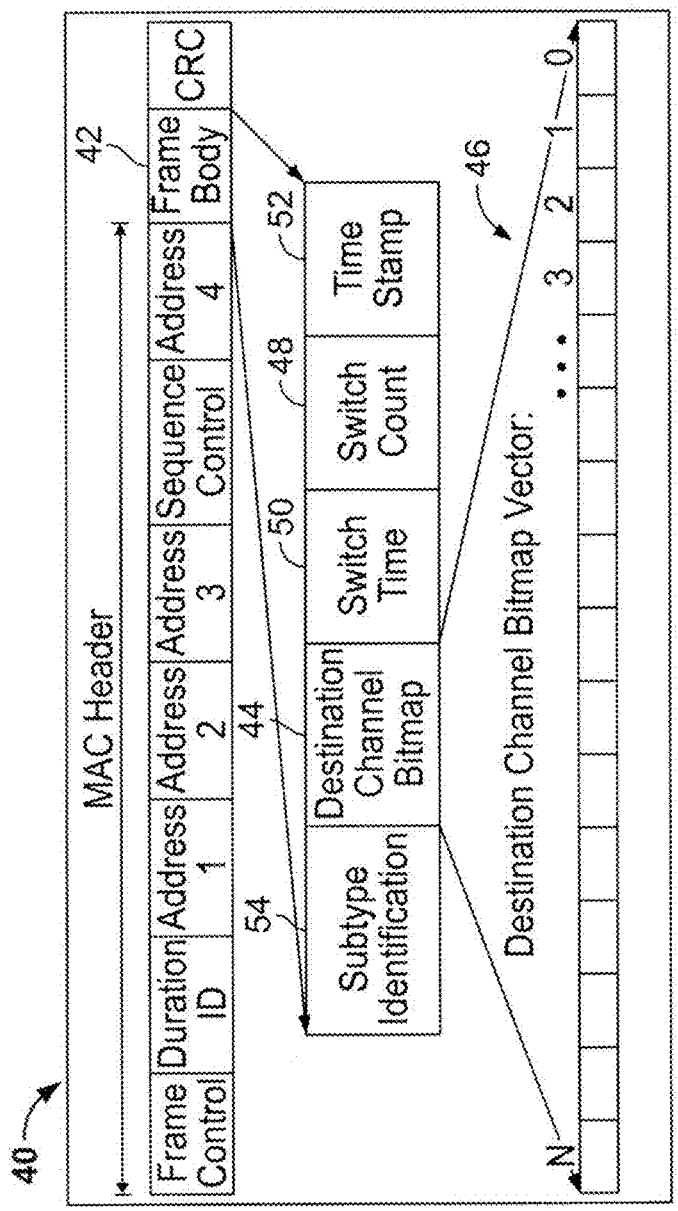
FIG. 3 is a schematic diagram showing the channel switching request MAC management frame structure.

The modified IMAC_input module 32 processes all the raw data, which comes from the hardware, including a modified management frame 40 (see FIG. 3). An extended management frame process function involving the management frame 40 has been implemented in the modified IMAC_Input Module 32. The management frame 40 structure supports identifying vacant channels as well as re-synchronizing nodes quickly. A frame body 42 in the management frame 40 has been modified to include a destination channel bitmap 44 which is defined in terms of a destination bitmap vector 46. The frame body 42 also includes a switch count 48, a switch time 50, a time stamp 52, and a subtype identification 54 which all coordinate to support the functioning of the frame body 42. The management frame processes involving the frame body 42 of the management frame 40 are described hereinafter.

Modified IMAC_Output Module

The modified IMAC_output module 34 takes care of the data frame, the management frame 40 and the control frame for output purposes. The modified IMAC_output module 34 wraps the data from the upper layer 14 into the suitable format, and then sends it to the hardware.

Incumbent sensing and detection is an important feature of cognitive radio IMAC layer 22 and the entire secondary communication based on dynamic spectrum access is dependent on this as spectrum is shared with licensed devices. Cognitive radio functions involved with incumbent sensing/detecting are described below.

Methodology for Sensing/Detection of Primary Incumbents

At any point of time, primary incumbents may be operating in a region and channel that is the same as that of the cognitive radio node(s). To co-exist with the incumbents, it is mandatory that incumbent sensing is done efficiently by the cognitive radio nodes.

However, as mere energy, noise and interference detection is not sufficient to distinguish a primary incumbent communication from other cognitive radio (secondary) communications, the IMAC layer 22 provides for accurate sensing/detection. The IMAC layer 22 provides processes for sensing/detection which is based on the preamble of the packets transmitted by primary incumbents which are always different than the preamble of the packets transmitted by cognitive radio nodes. Thus whenever the primary incumbents are present and transmitting (as well as unlicensed transmitting nodes), cognitive radios present in that channel will observe packets with different packet preamble or corrupted packet preamble (known as observed PHY errors) upon sensing of the channel. Thus observing PHY errors by cognitive radio nodes gives an indication of the presence of primary incumbents in a channel (as well as the presence of transmitting unlicensed nodes). Similarly, sensing/detection may be based on other parameters such as combination(s) of energy, PHY errors, cyclic redundancy checking (CRC) checksum errors, MAC address, and Internet protocol (IP) addresses.

The spectrum sensing process is divided into two processes:

In-band Fast Sensing: Fast sensing is done fairly quickly over a sensing window of duration T1 and it is performed in-band simultaneously with data transmissions (i.e., the cognitive radio node is sensing the presence of an incumbent which will trigger a switch to a vacant candidate channel). The advantage of in-band fast sensing is that data transmission time is not wasted.

Out-band Fine Sensing: Fine sensing on the other hand is mostly performed out-band for a sensing window of duration T2 (i.e., the CR node is sensing the presence of an incumbent in the candidate channel). Cognitive radio nodes become silent on the channel under consideration for sensing so that no network traffic is generated and incumbents are sensed. Data transmission time is wasted during out-band fine sensing and throughput of the network is compromised.

Note that, in another cognitive radio embodiment, the cognitive radio can have two internal radios. One radio can be used for in-band sensing while the other radio can perform out-band sensing simultaneously to determine vacant candidate channels. This would further contribute to the maintenance of throughput and the minimization of wasted channel capacity.

There are two major challenges in the above-mentioned sensing approach:

The PHY errors can be observed even in the absence of primary incumbents due to the unreliable nature of wireless medium.

In the In-band fast sensing, the cognitive radio nodes carries out communications at the time of sensing. Thus actual number of observed PHY errors is less here as cognitive radio nodes' communications suppress many of the PHY errors.

Note that, a simple static threshold of observed PHY error is not sufficient to sense/detect incumbents. If the threshold is set too low, the cognitive radio will incur high number of false alarms (assuming the existence of primary incumbent while the primary incumbent is actually not present). On the other hand, if the threshold is set too high, there will be a high probability of misdetection (concluding there is no primary incumbent while the primary incumbent is actually present). The IMAC layer 22 includes the dynamic optimized threshold 36 (see FIG. 1) that solves this problem. To fully understand the factors that support the dynamic optimized threshold 36, and the processes involved with its use, its method of discovery and empirical derivation are described below.

Empirical Derivation of the Dynamic Optimized Threshold

To solve the sensing/detecting problem described above, a methodology was devised to understand the distribution of PHY errors, and a study was conducted to determine the dynamic optimized threshold necessary to sense/detect the primary incumbents. The dynamic optimized threshold 36 study was based on PHY error data which was modeled to optimize the primary incumbent detection threshold. The experiments and analysis are provided below, first for in-band sensing and then for out-band sensing.

Figure 4:
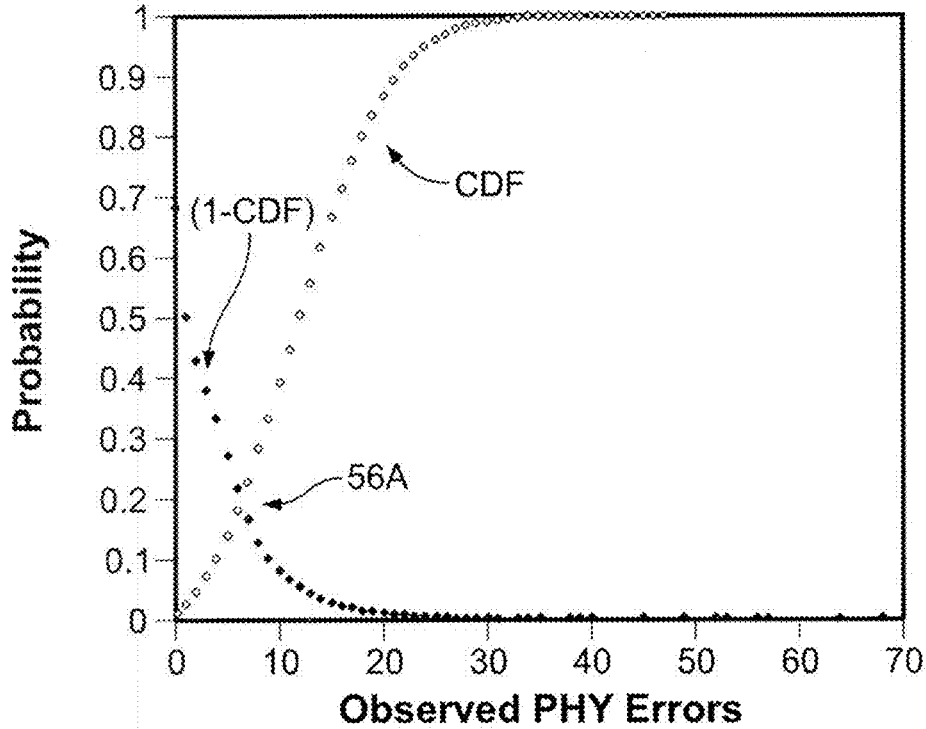
FIG. 4 is a graph showing the functional relationship of false alarm and misdetection Probability vs. PHY errors threshold for a 1-window sensing strategy (in-band fast sensing)

In-Band Fast Sensing:

FIG. 4 depicts a cumulative distribution function (CDF) and complementary cumulative distribution function (1-CDF) of the observed PHY errors of case (i) when primary incumbent is present and case (ii) when the primary incumbent is not present respectively from the experimentally observed data. The sensing window duration is assumed as 1, i.e., the experimentally observed data are calculated over the sensing duration T1. It can then be stated that, the CDF of the case when primary incumbent is present is actually a representation of the probability of misdetection given a certain PHY error threshold. Similarly, (1-CDF) of the case when primary incumbent is NOT present is actually a representation of the probability of false alarm given a certain PHY error threshold. FIG. 4 shows that a low threshold will reduce the misdetection probability; however it will increase the false alarm probability. On the other hand, a high threshold will increase the misdetection probability while it will reduce the false alarm probability. Thus, in one proposition, if it is required to minimize both false alarm and misdetection probabilities simultaneously, the intersection 56A of the two curves gives us the optimized minimized probability and the corresponding x-axis value will be the dynamic optimized threshold. Note that other proposition can also be used, e.g., minimizing misdetection probability alone if misdetection incurs high regulation cost, or even weightage minimization of false alarm and misdetection probabilities where misdetection probability might incur higher cost than false alarm or vice-versa.

Note that, with 1 window sensing duration of In-band fast sensing, the simultaneous minimization of both the probabilities provides the optimized threshold; however, as FIG. 4 indicates minimized error probability corresponding to the intersection 56A of the two curves CDF and (1-CDF) is around 0.15. This indicates that In-band fast sensing over sensing duration of 1 window (T1), although fast and able to be preformed simultaneously with data transmission of the cognitive radio, is unreliable and thus needs to be modified. Note that, in one embodiment, T1 equal to 20 milliseconds (ms) is utilized. Other embodiments can also be used (e.g., T1 equal to 30 ms, 50 ms, etc.)

Therefore, a new method of sliding or n-moving window In-band fast sensing is proposed (i.e., PHY errors are observed over n sensing window durations and moved continuously, overlapping in time—that is, two adjacent windows of measurement that overlap by n-samples). Note that, n can take any value of 2, 3, 4 . . . and so on.

Figure 5:
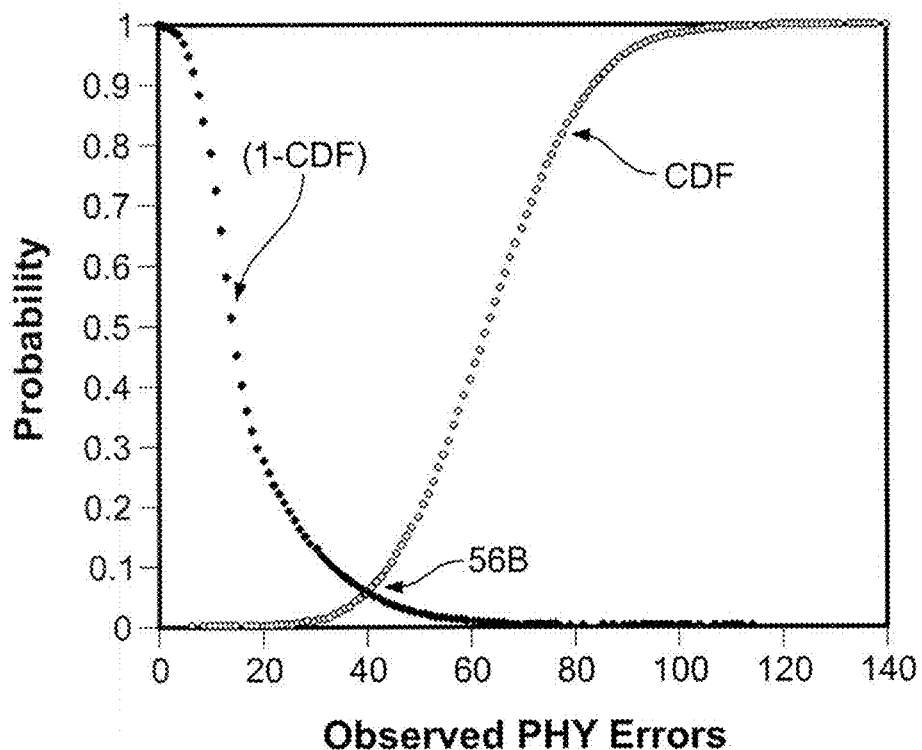
FIG. 5 is a graph showing the functional relationship of false alarm and misdetection Probability vs. PHY errors threshold for a 5-window sensing strategy (in-band fast sensing)

FIG. 5 depicts the experimentally observed results over a 5-moving window. Note that with 5-moving window sensing strategy of In-band fast sensing, the simultaneous minimization of both the probabilities give us the optimized threshold and indicates the minimized error probability corresponding to the intersection 56B of the two curves CDF and (1-CDF) is now around 0.04. This indicates that n-moving window In-band fast sensing provides better performance over sensing duration of 1 window (T1). Moreover, as data transmission for cognitive radio nodes are carried out simultaneously, data throughout is also not degraded at all.

Given the experimentally observed results of misdetection and false alarm; the analytical model of misdetection and false alarm probability distribution is invested. For finding the correct model of the probability distributions, in one embodiment, regression analysis and curve fitting are utilized. Note that, other embodiments can also be used, e.g., Linear least squares, Nonlinear least squares via trust region, Levenberg-Marquardt, Gauss-Newton algorithms and so on etc.

In one embodiment, an analytical equation is provided for calculating misdetection probability depending on observed PHY errors, the number of moving window strategy used for In-band fast sensing, and received signal strength (RSS). Similarly, in another embodiment, a false alarm probability analytical equation can also be derived. Then, $P_m$ can be denoted as the misdetection probability, and $P_m$ can be expressed as, $$P_m = 1/[1+e^{\alpha^*(\beta-r)}]$$

Where, r is the normalized observed PHY errors, and $\alpha$ and $\beta$ are two regressional parameters. Thus $\alpha$ and $\beta$ are functions of number of moving window strategy used for In-band fast sensing and received signal strength and can then be given by, $$\alpha = f_1(n,S) \text{ and } \beta = f_2(n,S)$$

Where, n denotes the number of moving window strategy and S denotes the received signal strength. In one embodiment, the function of $\alpha$ and $\beta$ can be derived using multivariate regression analysis. However, note that in other embodiment, similar data models can be used in conjunction with linear, quadratic regression models or any other similar methodologies.

The function of $\alpha$ can be then given by, $$\alpha = \lambda_1 + \lambda_2 S + \lambda_3 e^{-n} + \lambda_4 S^2 + \lambda_5 (e^{-n})^2 + \lambda_6 S e^{-n}$$

Where, $\lambda_i$'s are the regression parameters.
Values of $\lambda_i$'s are as follow $$\lambda_1 = 55.1; \lambda_2 = -40.7; \lambda_3 = 405; \lambda_4 = 9.23; \lambda_5 = -342; \lambda_6 = -59.4$$

Similarly, The function of $\beta$ can be then given by, $$\beta = \mu_1 + \mu_2 n + \mu_3 e^s + \mu_4 (e^s)^2 + \mu_5 n e^s$$

Where, $\mu_i$'s are the regression parameters.
Values of $\mu_i$'s are as follow:

$$\mu_1 = -0.0717; \mu_2 = 0.0197; \mu_3 = 0.0432; \mu_4 = -0.00171; \mu_5 = 0.00225$$

Similarly, the false alarm probability can be expressed as, $$P_f = 1/[1+e^{-\alpha'^*(\beta'-r)}]$$

Where, r is the normalized observed PHY errors, and $\alpha'$ and $\beta'$ are two regressional parameters. Thus $\alpha'$ and $\beta'$ are functions of number of moving window strategy used for In-band fast sensing and received signal strength and can then be given by, $$\alpha' = f'_1(n,S) \text{ and } \beta' = f'_2(n,S)$$

Where, n denotes the number of moving window strategy and S denotes the received signal strength.

Once the probabilities of misdetection and false alarm probabilities are calculated depending on observed PHY errors, n-moving window strategy and received signal strength, the aim is to find out the dynamic optimized threshold such that the probabilities of misdetection and false alarm are minimized. Note that, at any stage of the sensing, when a cognitive radio makes a wrong decision about a primary incumbent (sensing failure), it faces one of two possible costs in terms of time units. If the wrong decision results in misdetection, the cost (penalty) on the cognitive radio will be primary network policy specific and the cognitive radio will be blocked from spectrum access for a certain time. Note that we assume the cost as time units consumed. We assume this cost as $C_1$. On the other hand, if the wrong decision results in false alarm, the cognitive radio chooses to switch to some other clear band and it faces a cost of finding a clear spectrum band. We assume this cost to be $C_2$. Once the probabilities of misdetection and false alarm probabilities are calculated depending on observed PHY errors, n-moving window strategy and received signal strength, the aim is to find out the dynamic optimized threshold such that the penalty due to misdetection and false alarm is minimized. The optimization problem now becomes minimization of the total expected cost as given by $E(C) = C_1 \times P_m + C_2 \times P_f$. Expanding E(C), it can be written as $$E(C) = C_1/[1+e^{\alpha(\beta-r)}] + C_2/[1+e^{-\alpha'(\beta'-r)}]$$

To find out the dynamic optimized threshold, r, the first derivative of this equation with respect to r is equated to 0, as given in $$C_1 \alpha e^{\alpha(\beta-r)}/[1+e^{\alpha(\beta-r)}]^2 - C_2 \alpha' e^{-\alpha'(\beta'-r)}/[1+e^{-\alpha'(\beta'-r)}]^2 = 0.$$

Solving mathematical derivations, we find the optimized threshold, $r=r^*$, such that it is satisfied by, $$\cos h(\alpha(\beta-r^*)/2)/\cos h(\alpha'(\beta'-r^*)/2) = \sqrt{(\alpha C_1/\alpha' C_2)}.$$

The second order differentiation, $d^2E(C)/dr^2$, can be shown to be positive (with simple derivations), proving the function E(C) to be convex with respect to r. This also proves that the optimal value of $r=r^*$ is the desired minimize for the total expected cost E(C). Similarly, in other embodiments, other approaches e.g., sole minimization of misdetection or sole minimization of false alarm probability or equal weightage minimization objectives can be used.

Out-Band Fine Sensing

Figure 6:
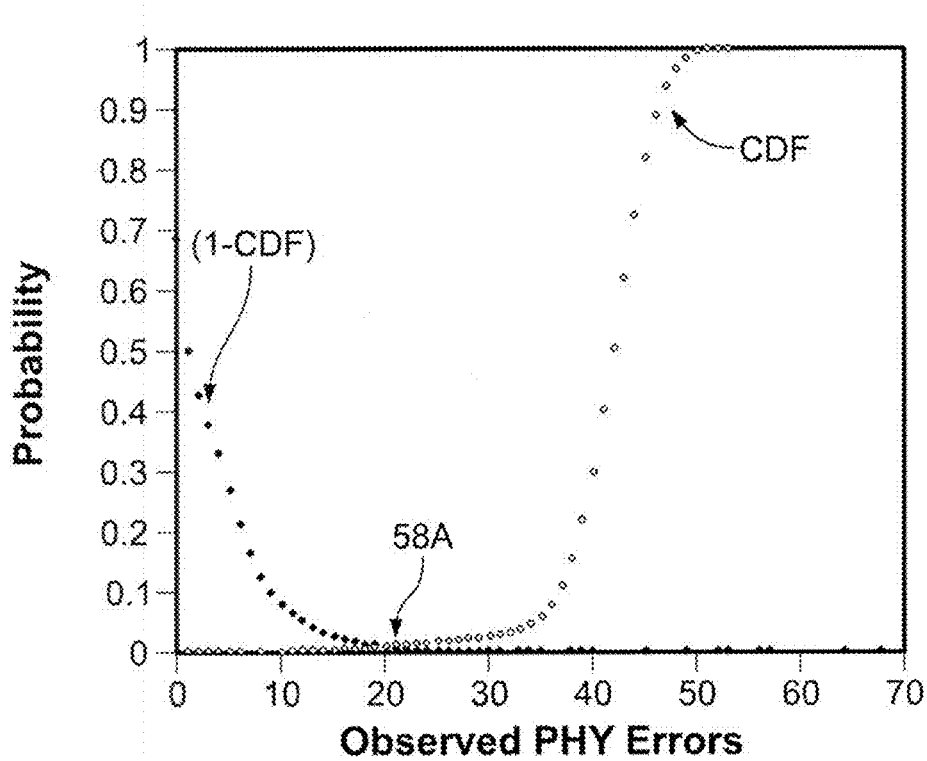
FIG. 6 is a graph showing the functional relationship of false alarm and misdetection Probability vs. PHY errors threshold for a 1-window sensing strategy (out-band fine sensing)

In a similar approach to In-band fast sensing, similar experiments and analysis are performed for out-band fine sensing. FIG. 6 depicts the cumulative distribution function (CDF) and complementary cumulative distribution function (1-CDF) of the observed PHY errors of case (i) when primary incumbent is present and case (ii) when the primary incumbent is not present respectively from the experimentally observed data. The sensing window duration is assumed as 1, i.e., the experimentally observed data are calculated over the sensing duration T2. Note that, with out-band fine sensing, cognitive radios do not communicate so the observed PHY error is less suppressed here. In one embodiment, the experimental results are provided where T2 is assumed same as T1 from In-band sensing. However, another embodiment can also be used where T2 is greater or smaller than T1.

Figure 7:
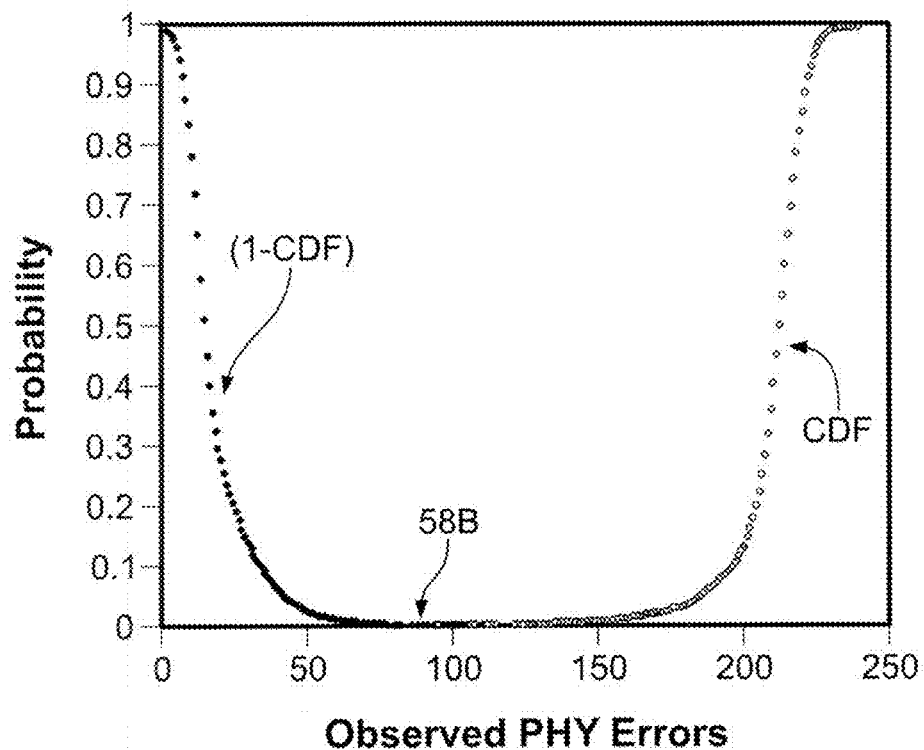
FIG. 7 is a graph showing the functional relationship of False alarm and misdetection Probability vs. PHY errors threshold for 5-window sensing strategy (out-band fine sensing)

As evident from the FIG. 6, the minimized error probability corresponding to the intersection 58A of the two curves CDF and (1-CDF) is much less than that of the In-band sensing experimental observations with 1-window duration. FIG. 7 shows the out-of-band sensing results with 5-moving window strategy, with the minimized error probability corresponding to the intersection 58B of the two curves CDF and (1-CDF) is less than that of the out-of band sensing experimental observations with 1-window duration.

Similar to the analytical method presented in In-band sensing, the same approach is utilized to find out the misdetection and false alarm probability distribution and the optimized threshold depending on observed PHY errors, n-moving window strategy, and received signal strength.

Figure 8:
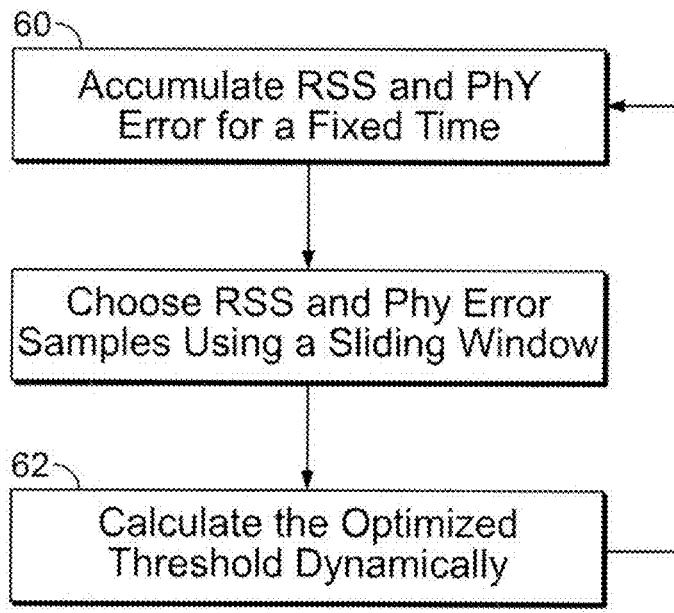
FIG. 8 is a flow diagram showing optimized dynamic threshold calculation.
Figure 9:
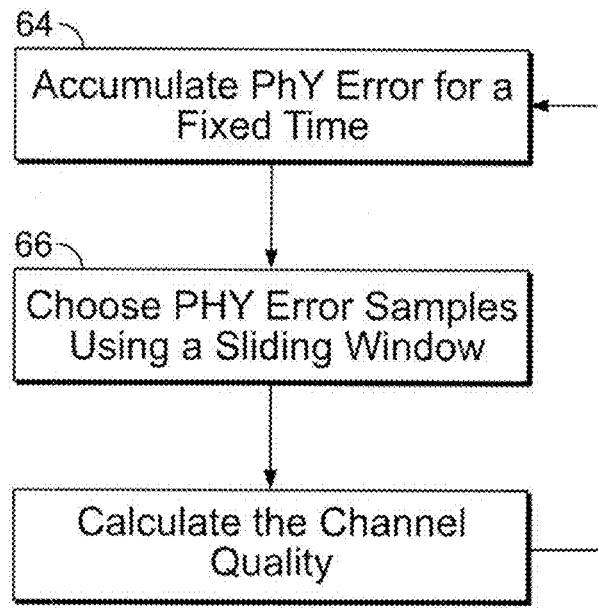
FIG. 9 is a flow diagram showing channel quality evaluation flow chart.

FIG. 8 illustrates the processes to sense the channel and compute the optimized dynamic threshold 36 for detection. The RSS and PHY errors are sensed and the values are accumulated in step 60. The dynamic optimized threshold 36 is calculated in process 62 (i.e., where $r=r^*$ is the minimize for the total expected cost E(C) equation described above). The accumulated PHY error value (i.e., the dynamic optimized threshold 36 determined in step 62) is used to compute the channel quality. More particularly, FIG. 9 shows the processes involved in computing the channel quality (i.e., a measurement based on parameters such as PHY errors, CRC errors, RSS, etc.). The PHY errors are accumulated for a fixed time at process 64, and place into a sliding window comprising n-windows at process 66. For example, a higher PHY error value indicates a lower channel quality.

Figure 10:
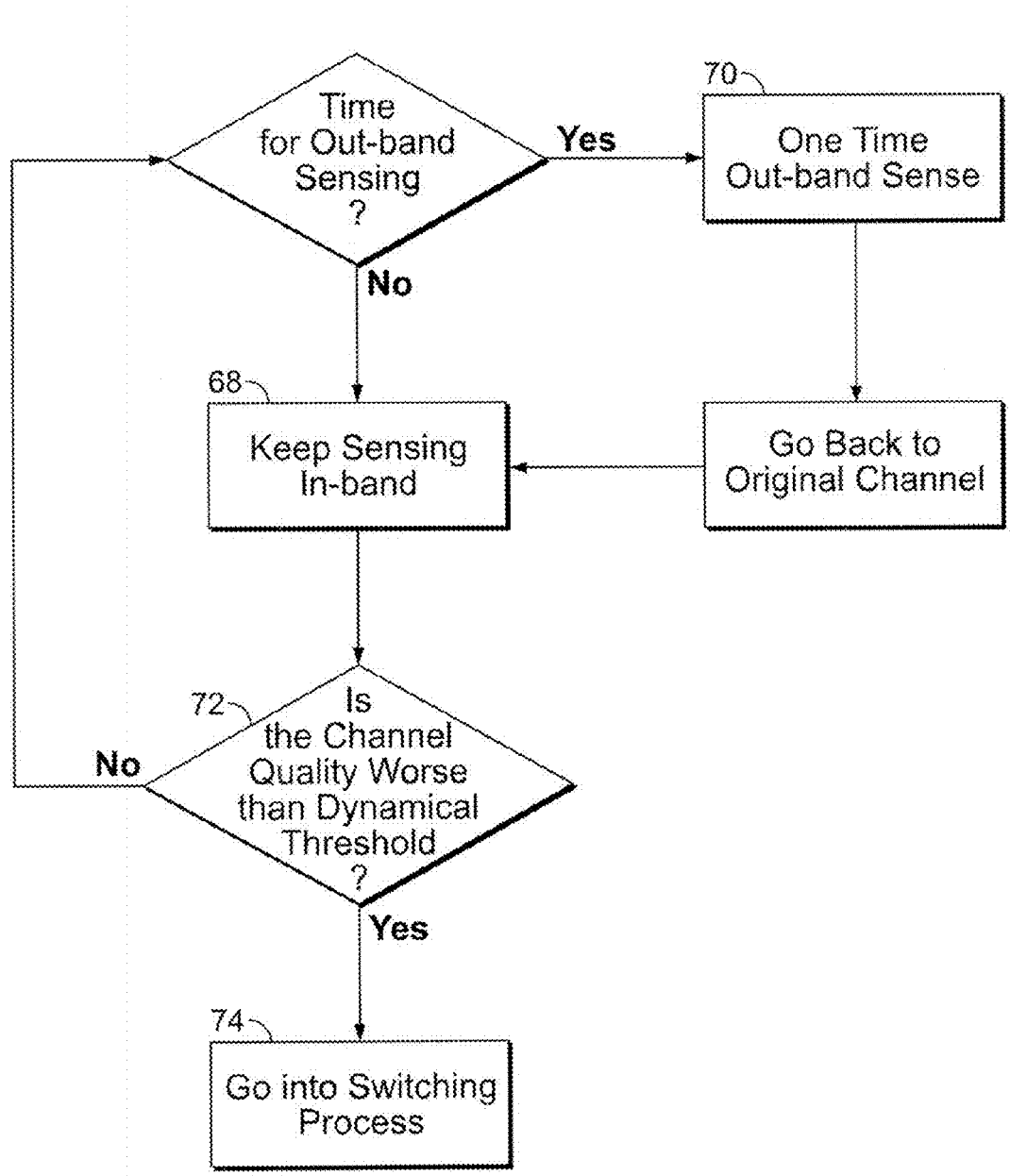
FIG. 10 is a flow diagram showing in-band sensing and out-band sensing process flows.

FIG. 10 shows the processes involved in channel sense and switch processes. Step 68 is involved the in-band sensing, and step 70 is involved with out-band sensing. If, at step 72, the accumulated PHY errors is greater than the dynamic optimized threshold 36, (i.e., the channel quality is worse than the channel quality determined at the dynamic optimized threshold 36), then the trigger to begin switching occurs (see step 74).

Methodology for Synchronization and Dynamic Spectrum Access

Once the trigger to begin switching occurs (i.e., switch/move following sensing/detecting a primary incumbent), switching and re-synchronization must occur rapidly. The processes for efficient dynamic spectrum access and channel switching and synchronization are described below.

Special Purpose Hardware Queues Design

The two special hardware queues, the synch queue 24 and the data buffer queue 26 (i.e., discussed above in relation to the HAL layer 18 and FIG. 1) become active whenever any dynamic channel switching needs to be triggered. The synch queue 24 is used for transmitting synchronization management frames. The synchronization management frames are special purpose frames, as depicted by arrows 1-3 in FIG. 11, and are used for synchronization between the communicating nodes at the time of switching. Whenever any of the communicating cognitive radio nodes sense the necessity of channel switching (initiator node), it then enables the sync queue 24 and triggers a channel switching request management frame 40 simultaneously with the ongoing data communication. Inside the synchronization management frames 40, the destination channel information is provided (i.e., candidate frequency channel(s)) are provided to which the CR nodes desire to switch to upon vacating the current channel).

Figure 12:
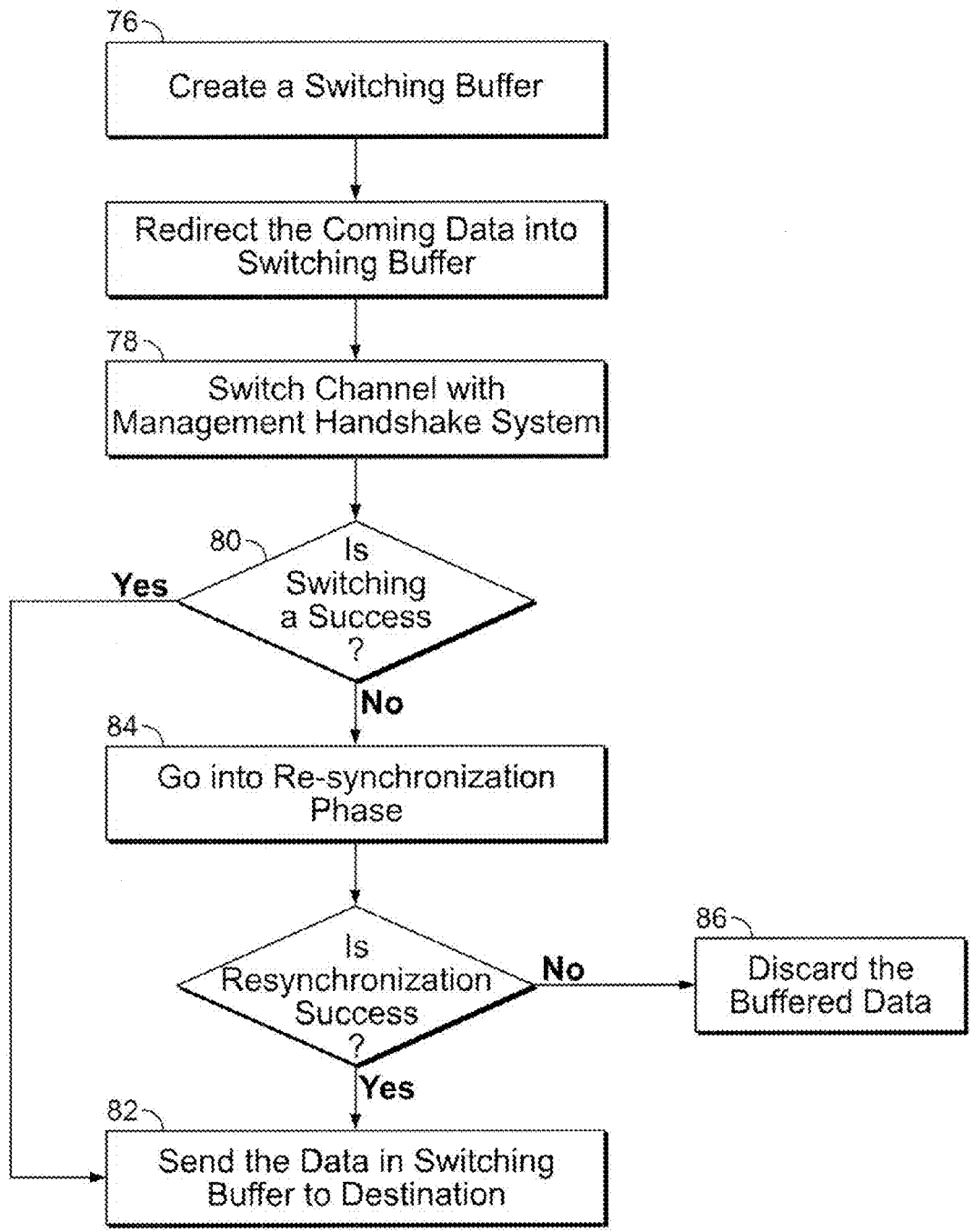
FIG. 12 is a flow diagram showing channel switching progress.

FIG. 12 shows the processes involved during channel switching. More particularly, if a channel switch event is triggered (as shown in process 74 in FIG. 10) then a switching buffer (not shown) implemented in software is first created at step 76. The switching buffer includes the software buffer (not shown) and the data buffer queue 26. The upper layer 14 data is temporarily stored in the data buffer queue 26. The handshaking process for channel switching between the transmitter and the receiver is triggered at process 78. If the channel switching is successful at process 80, then the data stored in the data buffer queue 26 portion of the switching buffer is transmitted to the receiver in process 82. If the switching fails, then the re-synchronization process is triggered at process 84. If the re-synchronization process is successful then the buffered data in the data buffer queue 26 is transmitted to the receiver at step 82. If this process fails then the buffered data stored in the data buffer queue 26 is discarded (see process 86).

The data buffer queue 26 is enabled when the communicating CR nodes are physically switching channel and the MAC layers 12 are being configured with the transmission and reception parameters in the new frequency band. With data buffer queue 26 enabled, a local memory for buffering the data temporarily from the upper layers 14 is established so that no data from upper layers 14 will be lost and the switching scheme will not create any adverse effect.

With the synch queue 24 and the data buffer queue 26, dynamic channel switching in the MAC layer 22 is hidden from the upper layers 14. As a result, upper layer 14 functionalities are not affected at all thus creating smooth, seamless switching.

Figure 11:
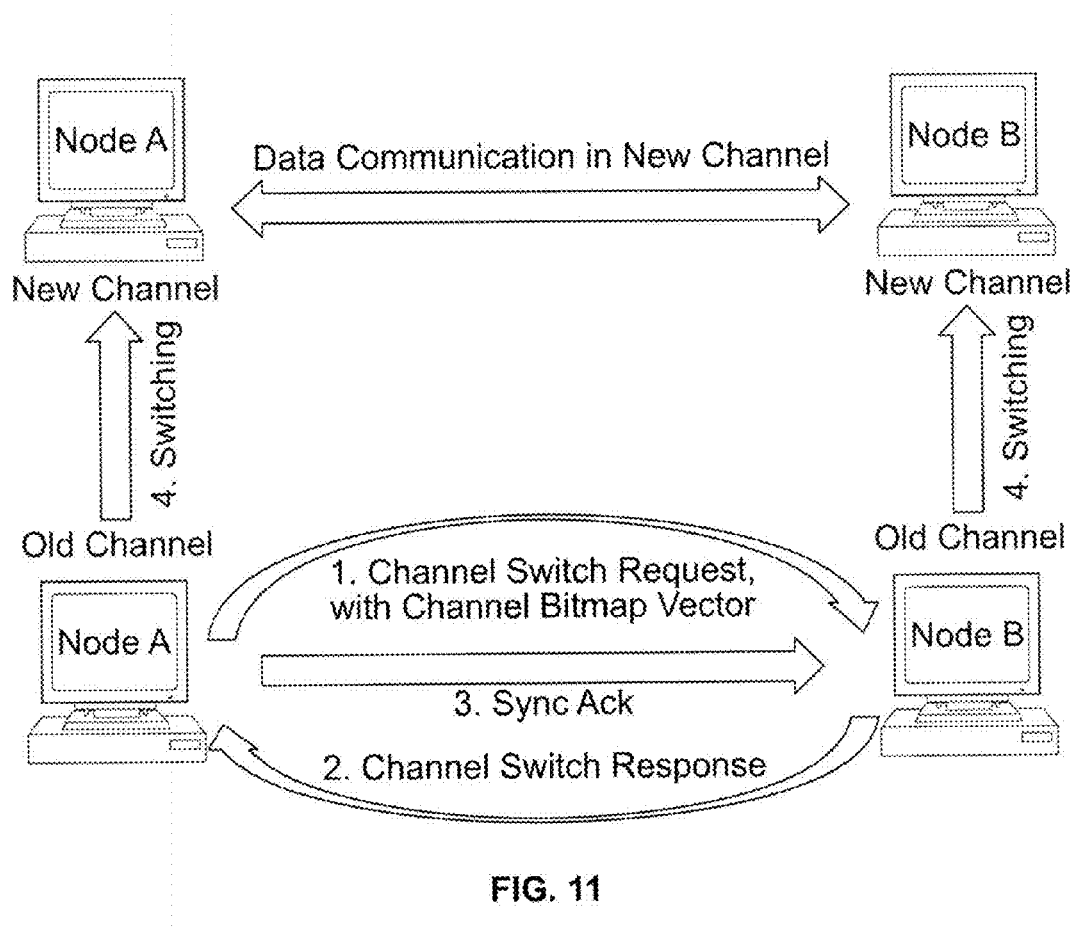
FIG. 11 is a diagram depicting dynamic frequency switching with bitmap vector enabled channel switching request and response management frame.

Special Purpose Synchronization Management Frame and Multiple Candidate Frequencies FIG. 11 shows the processes of sensing, sending the channel switching request management frame 40, receiving a response to the request, and the re-synchronizing the nodes. More particularly, cognitive radios nodes may experience functional problem cause by a hidden incumbent. To fully understand the hidden incumbent problem, let us assume that two cognitive radios (node A and node B) are communicating with each other using a specific frequency channel and an incumbent returns to the same frequency channel. Successfully sensing the primary incumbent, suppose, node A transmits the channel switching request management frame 40 (see arrow 1). The channel switching request management frame 40 will contain the information of a channel which node A assumes to be not used by any incumbent and intends to move to. However, node B might not have that channel as vacant as some other primary incumbent might be using that channel in the vicinity. This information may be unreachable to node A (e.g., because of signal interference) making this a hidden incumbent problem. Thus if node A sends its vacant channel information to B and switches straightaway, two situations might appear because of the hidden incumbent problem: (i) node B will not be able to respond to this request, i.e., will not be able to switch to the new frequency node A has suggested. This will result in loss of communication between node A and node B. (ii) node B will respond to this request, i.e., will switch to the new frequency node A has suggested. This will result in breaching primary incumbent avoidance policy as node B's communication will now interfere with the primary incumbent in the new frequency.

To address the hidden incumbent problem, the channel switching request management frame 40 uses multiple available frequency (i.e., multiple candidate frequencies) information inside the destination channel bitmap 44 in the channel switching request management frame 40. The number of candidate frequencies is updated dynamically by the initiator node depending on the feedback received from the receiving communicating CR node. The reason behind transmitting synchronization message with multiple candidate frequencies is that even if the receiving CR node encounters a licensed incumbent transmission (hidden to the initiator CR node), it still has ways to choose other candidate channel and report this incumbent transmission to the initiator using a similar management frame called a channel switch response management frame. The channel switch response management frame (see arrow 2) and the synch acknowledgement frame (see arrow 3) are similar to the channel switching request management frame 40, except the subtype identification 54 fields (see FIG. 3) are set to a particular value to identify them as either a channel switch response management frame or a synch acknowledgement frame. In the case of multiple responses, the subtype identification 54 field along with the switch count 48 field (see FIG. 3) are utilized. With this mechanism, even with the presence of a hidden incumbent node, the risk of synchronization failure is reduced significantly.

Destination Bitmap Channel Vector

With primary devices dynamically accessing the primary bands, the availability of the spectrum bands for cognitive radio node operations changes dynamically. Multiple candidate frequency channels sent by initiator nodes may be used; however embedding absolute information (spectrum band frequency) of candidate frequency channels would invoke the challenge of variable length management frame. This would result in the management frames utilizing more time to decode as more processing of header information would be necessary for variable length frames. This may adversely affect communication throughput.

In order to solve this issue, the destination channel bitmap vector 46 is utilized for sending candidate channel(s) information. Let us assume that there are total N spectrum bands in the vicinity of the cognitive radio network, any or some or all of which can become available at any time and could act as candidate channel(s). The length of the destination channel bitmap 44 uses two bytes in the frame body 42. More particularly, when a candidate channel is available, the corresponding bit in the destination channel bitmap vector 46 is set to 1; otherwise, it is set to 0.

Note that, the an advantage of using the destination channel bitmap vector 46 for transmitting candidate frequency information is that the fixed length channel switching request management frame 40 can be used even with the dynamic availability of candidate frequency information, which makes it sufficiently easy and quick to decode. Moreover, with the usage of the destination channel bitmap vector 46, the management frame 40 becomes easily scalable. For instance, if there are more than 16 non-overlapping channels in any system, the destination channel bitmap vector 46, is expanded. The switch count 48 field in the frame body 42 indicates when the initiator node will timeout from the current synchronization mechanism (if no synchronization could be established; i.e., even after multiple switching requests, no response frame is received from the other communicating CR node) and will vacate the current channel.

Dynamic Synchronization between Communicating Cognitive Radio Nodes

Figure 13:
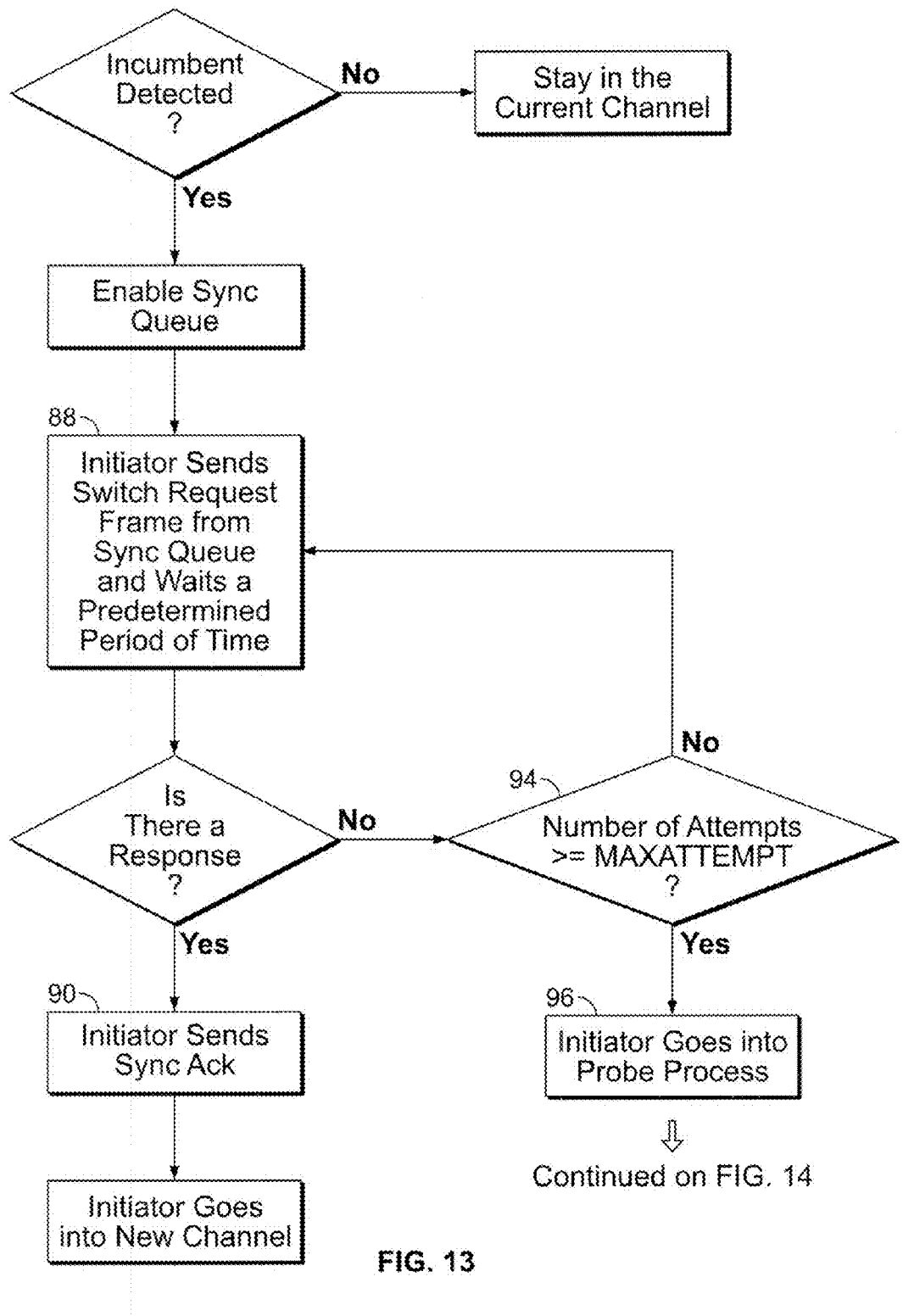
FIG. 13 is a flow diagram showing a switching request flow chart from an initiator's perspective.
Figure 14:
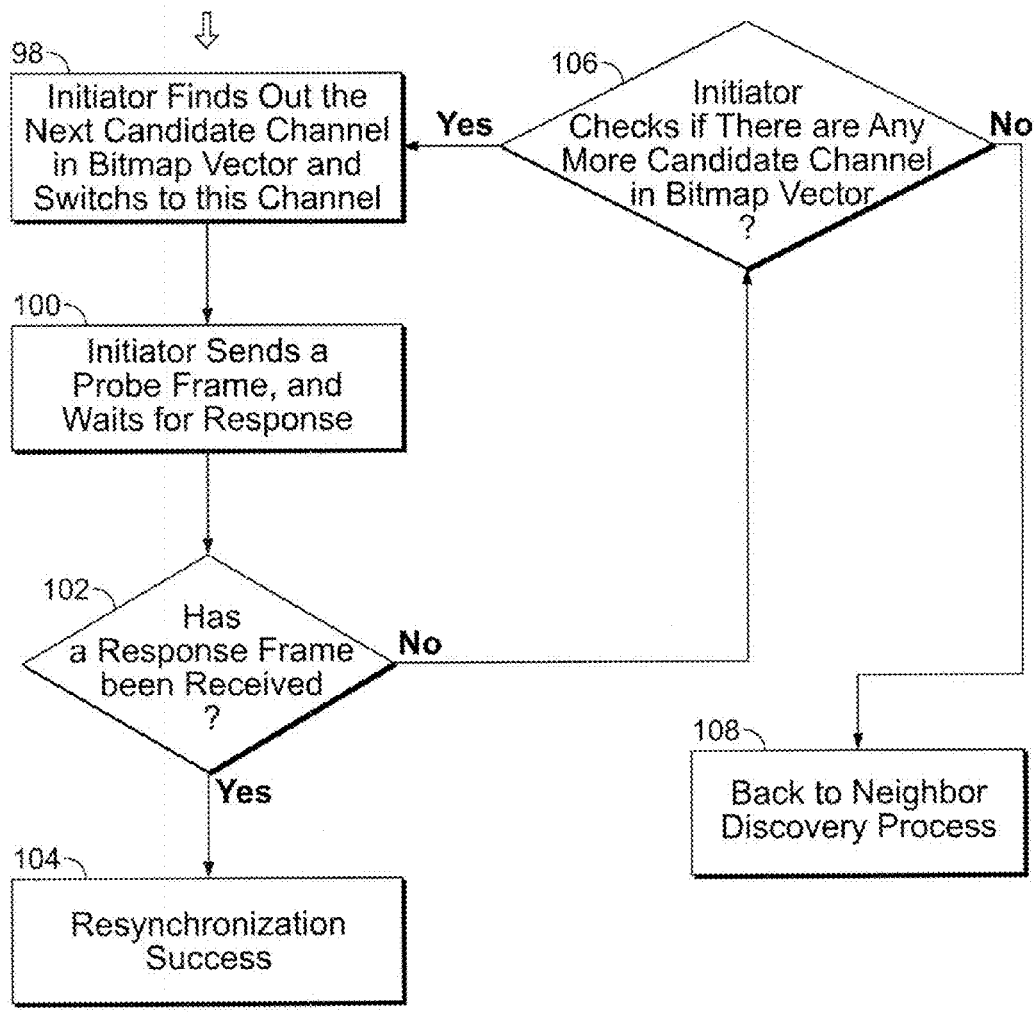
FIG. 14 is a flow diagram showing re-synchronization phase through quick probing.

Referring to FIGS. 13 and 14, the process flows for dynamic channel switching is shown. The channel switching procedure is divided into two phases. The initial phase establishes the synchronization through multiple attempts (if needed) of management frame handshaking and enables the communicating nodes to switch channel successfully. If at all initial phase failure happens, the second phase acts as a quick rescue process, which introduces a channel quick probing mechanism that takes charge of re-synchronization of both the nodes. Both phases are described below.

Initial Synchronization Phase—Phase 1

In this method, synchronization is not dependent solely on synchronization of the management frame 40 from one of the two communicating CR nodes. Rather, the process of synchronization with both channel switching request management frame 40 (from the initiator) and response management frames (from the receiver) is provided. When a channel switching action is needed (sensed by any of the communicating CR nodes), that node (initiator) will send a switch request 40, including destination channel bitmap vector 46 in the payload.

However, note that, there is a possibility that both the nodes in communication detect the arrival of an incumbent device, and both become initiators and initiate channel switch request management frames 40 with information about the candidate channel(s) in their destination channel bitmap vectors 46. This might cause a clash in the synchronization mechanism. However, this problem is solved by reference to the channel switching request management frame 40 time stamp 52 field which indicates when the request was generated. If both the CR nodes initiate channel switch request management frames 40, the one with earlier timestamp will win. The time stamps 52 will permit both the nodes to decide on the winner (initiator) and other node will automatically follow the role of receiver.

Referring again to FIG. 11, upon reception of channel switching request management frame (see arrow 1), the receiver (node B) then decides on the new channel to switch to (deciding from the destination channel bitmap vector 46) and initiates a channel switching response management frame back to the initiator (node A) (see arrow 2). With this channel switching response management frame, the initiator and the receiver have now mutually agreed upon the destination channel to which they would move to. As the last step of the handshaking procedure the initiator sends out a quick synchronization frame acknowledgment (see arrow 3) to the receiver and moves to the new channel. The receiver upon receiving the synchronization frame also immediately moves to the new channel.

As shown in FIG. 13, after the initial channel switching response management frame is transmitted at step 88, a response timer is set up to run for a maximum attempt time (also at step 88). When the initiator receives the switch response frame, it will send a sync acknowledgement frame, and then switch into destination channel immediately as depicted in steps 90 and 92. However, if there is no response frame received within the response time, the initiator will confirm the attempt times and the final timeout switching time.

In one arrangement, the maximum attempt time is set to be three and the final timeout switching time to be five times the estimated single round trip timeout (see steps 88 and 94). Thus if the timing permits and if the number of attempts made is less than 3, initiator node will repeat the switch request, setup response timer, wait for timer to expire and look for the response frame again. However, in other arrangements, maximum attempt times could also be made 2, 4, 5 etc. and final timeout switching time may be varied.

Channel Switching Request Management Frame Transmission Scheme:

The transmission of a dynamic variable number of channel switch request management frames 40 are provided in each of the multiple synchronization attempts. In one scheme, two management frame transmission schemes like (1,1,1) and (1,2,3) are compared. For example, the (1,1,1) scheme uses 1 management frame 40 in each of the three synchronization attempt(s). On the other hand, the (1,2,3) scheme uses three attempts of synchronization with 1 frame transmitted in the first attempt, 2 frames in the second attempt and 3 frames in the third and final attempt. Note that, (1,2,3) scheme presents more robustness in terms of redundancy than (1,1,1) scheme, however, at the same time, it introduces more management frames (overhead) than the (1,1,1) scheme. Obviously, (1,1,3) or (1,3,5) or similar transmission schemes could also be used and the tradeoffs may be evaluated. In contrast, if the attempts made are equal to the maximum allowable number of attempts and still no response frame is received even after response timer expired, this node will go into the second phase of the channel switching mechanism, i.e., quick probing and re-synchronization at step 96 in FIG. 13.

The initial synchronization phase 1 may fail (even after multiple attempts) due to one of two following reasons:

(i) All the switching request frames themselves are lost (though this is a very highly unlikely case and has not been encountered in experimental research associated with development of the present invention) resulting in a fatal scenario of synchronization failure in which case the CR nodes may end up in different spectrum bands resulting in loss of communication. The receiver node does not have any information about the candidate channel(s).

(ii) The receiver may have received the switching request frame(s) 40 from the initiator, but the response frame got lost in all the response attempts (i.e., the receiver node would understand this if it does not receive any sync message from the initiator). However, the receiver now at least has the knowledge of the candidate channel(s) and the final timeout switching time from the initiator's perspective. The receiver then moves to one of the suitable candidate channels.

When the attempts made are equal to the maximum allowable number of attempts and still no response frame is received even after response timer expired, the initiator does not have any knowledge of whether the receiver has received the desired information; thus assumes this as a synchronization failure, times out, vacates the current channel and starts the re-synchronization attempt through quick probing at process. The quick probing is described below, in Phase 2.

Re-Synchronization Phase Through Quick Probing—Phase 2

FIG. 14 illustrates the processes necessary to re-synchronize two nodes if initial Phase 1 failure happens. Note that, even if the synchronization failure happens, it is not desired for the communicating CR nodes to go to the neighbor discovery process (i.e., scan to rebuild the neighbor table) straightaway because of the high time consuming nature of the process. Thus quick probing is provided as a middle path rescue process through Phase 2.

At steps 98, the initiator selects the candidate channel(s) from the destination channel bitmap vector 46 for the purpose of quick probing. The initiator will go to the first candidate channel, transmit a quick probe management frame 40 and tries to sense if there is any probe response from the receiver (see processes 100 and 102). If it receives a probe response (i.e., the probed channel is clear of incumbent operation) both nodes will be re-synchronized at step 104; otherwise the initiator moves onto the next candidate channel (see process 106). This process will be repeated until probe response is received in one of the candidate channels or all the candidate channels are scanned; after which the CR nodes will go to the neighbor discovery process at step 108.

Actual CR prototype testing has been conducted. The testbed setup and experimental results are described below.

Testbed Setup and Experimental Results

Extensive experiments for evaluating the implementation of the CR prototype system with dynamic channel switching policy have been conducted. Note that, other embodiments may also be used. For performance evaluation purpose, the focus was on four metrics—average synchronization attempt, average time to synchronize, effective throughout and management frame overhead. In this regard, both the management frame transmission schemes, (1,1,1) and (1,2,3) are compared.

Testbed Setup

CR nodes (laptops) were setup in a region of radius 25 meters, communicating with TCP data stream and are enabled with dynamic channel switching policy. To conduct extensive testing under different channel congestion environments, experiments under different network traffic scenarios in the presence of other communicating nodes in both indoor and outdoor environment were conducted. Each laptop running Linux 2.6 operating system is equipped with Orinoco 802.11a/b/g PCMCIA wireless card. These Orinoco devices are equipped with Atheros 5212 (802.11 a/b/g) chipsets. The TX powers of these wireless devices were set to 100 mW. In this test bed, cordless phones are emulated as primary license holder such that whenever any cordless phone access any channel that the cognitive radio is operating on, the cognitive radio node upon successful sensing/detection must vacate that channel and move to a new channel.

Experimental Results

Figure 15:
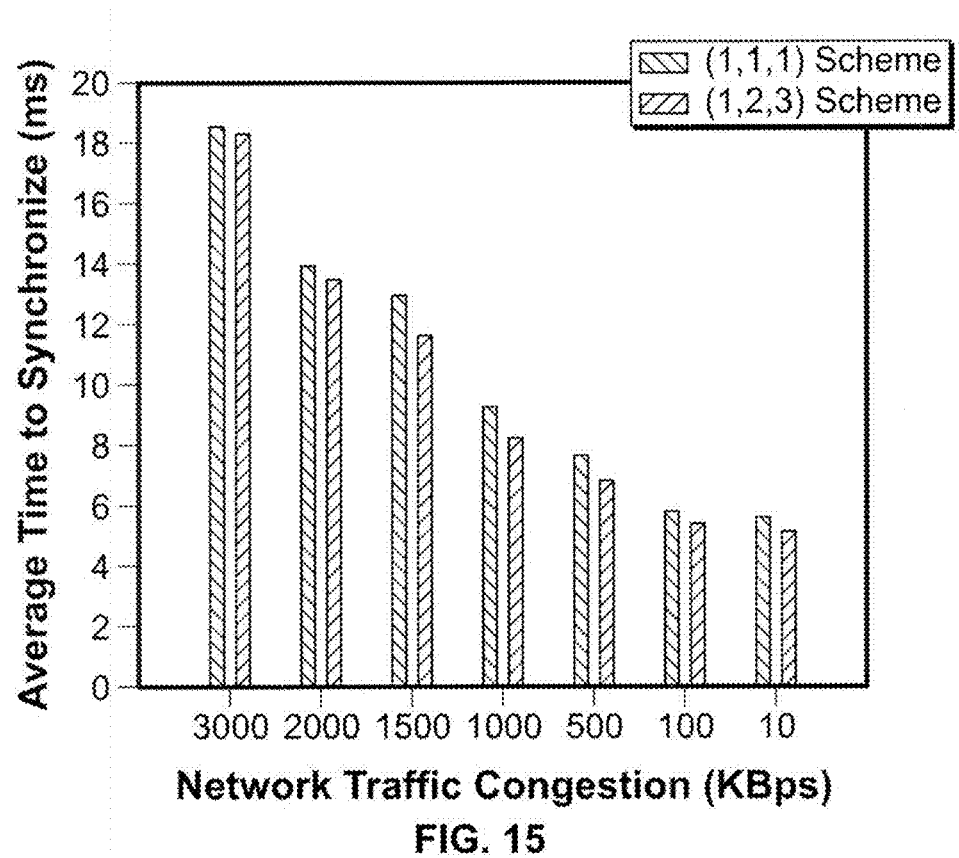
FIG. 15 is a graph showing average synchronization time under various network traffic with (1,1,1) and (1,2,3) scheme.

To provide a better insight into the results, the average (averaged over 2000 instances of switching for each of the experiments) switch and synchronization times for different network congestion states and under both (1,1,1) and (1,2,3) schemes were compared (see FIG. 15). Seven (7) different network congestion states were considered. It is evident from the results that with network traffic congestion decreasing, average time to synchronize also decreases for both the mechanisms as less number of synchronization attempts are required with low network traffic congestion. Moreover, it is seen from the comparisons that (1,2,3) scheme produces better results than (1,1,1) in terms of average time required. However, another interesting observation from the comparison is that, when the network congestion state is very high (approx. 3 MB/s or 2 MB/s), there is not much difference between (1,2,3) and (1,1,1) scheme; the difference increases as the network congestion state is medium (approx. 1.5 MB/s-0.5 MB/s), where the (1,2,3) scheme produces significantly better results than (1,1,1). Again the difference decreases when the network congestion state is low (approx. 100 KB/s or 10 KB/s).

Figure 16A:
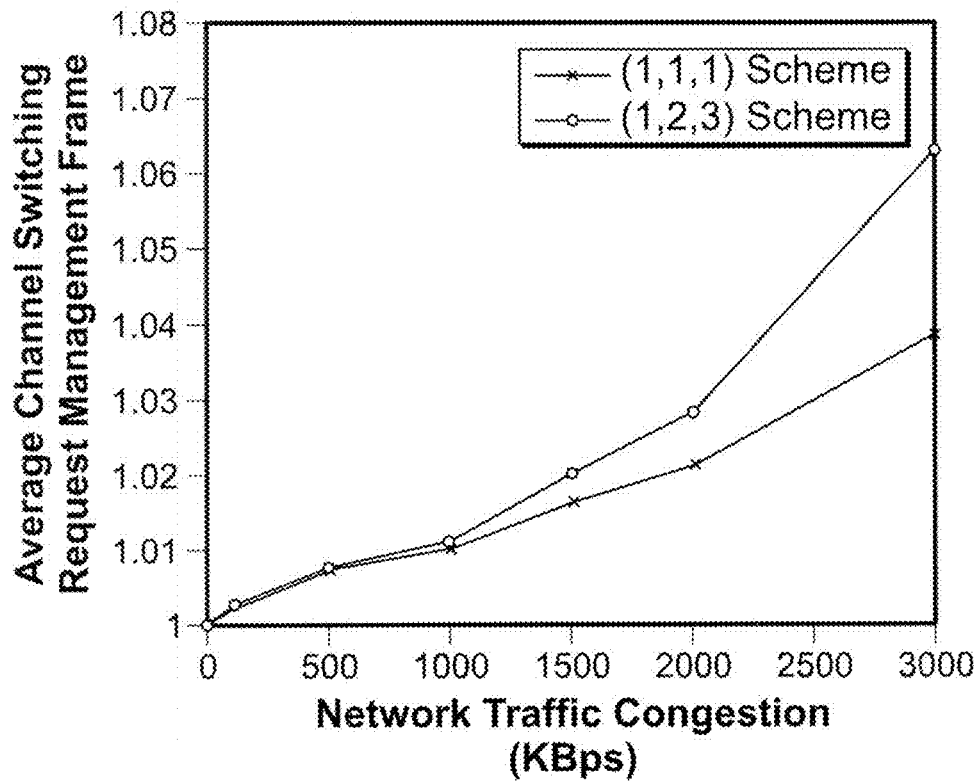
FIG. 16a is a graph showing average channel switching request management frames required.
Figure 16B:
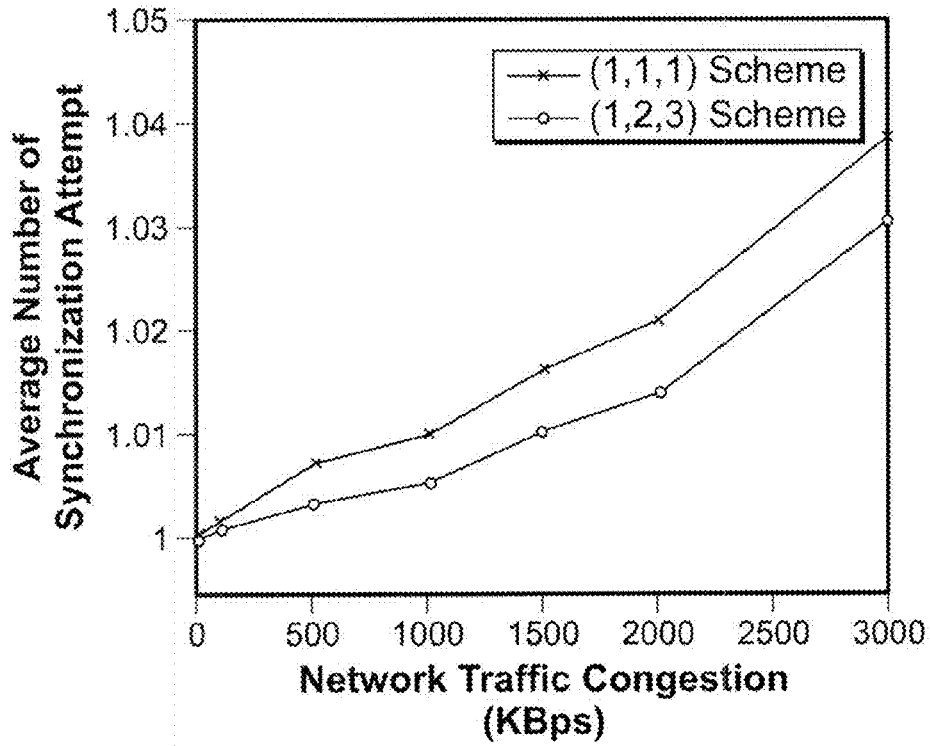
FIG. 16b is a graph showing average synchronization attempts under various network traffic with (1,1,1) and (1,2,3) scheme.

FIGS. 16*a* and 16*b* show the comparison results of average number of channel switching request management frames 40 required and average number of synchronization attempts made for each of the dynamic channel switching attempts under both (1,1,1) and (1,2,3) scheme. The comparison is made under all 7 different types of network congestion states specified above. It is observed from the result that, though average number of switching request management frames 40 (overhead) required to synchronize in each switching is slightly greater in case of (1,2,3), but average number of synchronization attempts made under (1,2,3) scheme is lesser than (1,1,1) thus resulting in less average time to switch and synchronize as seen FIGS. 16*a* and 16*b*.

Figure 17:
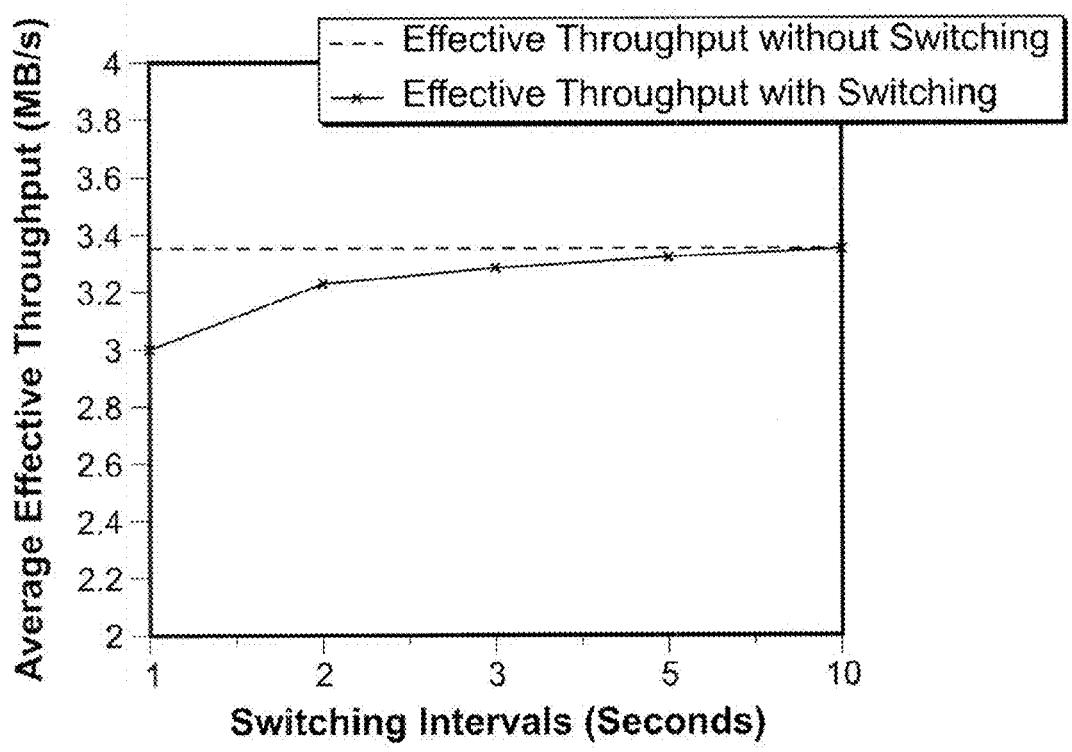
FIG. 17 is a graph showing average effective throughput with various frequency intervals.

Finally, FIG. 17 shows the effective throughput achieved in the CR prototype with the dynamic switching policy. The experiment was conducted to evaluate the performance of the system and its effect on the data throughput. The results are plotted against different switching intervals (1, 2, 3, 5 and 10 seconds). For benchmarking purpose, the ideal maximum throughout achieved under the same environment and conditions without any frequency switching is calculated. The dotted line in FIG. 17 depicts the maximum possible throughput (3.353 MB/second-benchmark). As evident from FIG. 17, the CR system demonstrates high throughput even with very high frequent switching and as obvious, with less frequent switching (switching every 5 seconds or 10 seconds), the throughput achieved is almost same as the benchmark throughput; proving the effectiveness of the CR prototype.

It will be understood that the embodiment described herein is merely exemplary and that a person skilled in the art may make many variations and modifications without departing from the spirit and scope of the invention. For instance, all such variations and modifications are intended to be included within the scope of the invention as defined in the appended claims.

We claim:

1. A method for facilitating communication between first and second communication devices, comprising the steps of:
    establishing a first communication link between the first and second communication devices through a first channel, the first channel being licensed to a primary user, and the first and second communication devices being unlicensed devices permitted to use the first channel when it is not in use by the primary user;

monitoring the first channel to determine whether the first channel is used by the primary user in establishing a communication link therethrough, said monitoring step including the steps of determining an in-band threshold dynamically based on a first set of parameters detected in the first channel and determining a channel quality of the first channel dynamically based on a second set of parameters detected in the first channel; and establishing a second communication link between the first and second communication devices through a second channel if the channel quality of the first channel at a given time exceeds the threshold.

2. The method of claim 1, wherein said step of determining the in-band threshold includes the steps of detecting the first set of parameters; and calculating the threshold based on the detected set of parameters, said detecting step and said calculating step are performed repeatedly on a predetermined time cycle.

3. The method of claim 1, further comprising the steps of:
determining an out-band threshold dynamically based on a third set of parameters detected in the second channel;
determining a channel quality of the second channel based a fourth set of parameters detected therein; and
determining whether the second channel can be used for establishing the second communication link by comparing the out-band threshold of the second channel to the channel quality of the second channel.

4. The method of claim 1, wherein said step of determining the in-band threshold includes the steps of collecting experimental data relating to channel parameters and building a mathematical model based on the experimental data to optimize the threshold.

5. The method of claim 4, wherein the threshold is determined so as to minimize the probability associated with false detection of a primary user in a channel when the channel is not in use by the primary user of the channel, and the probability associated with false misdetection of the primary user of the channel when the channel is in use by the primary user of the channel.

6. The method of claim 5, wherein the mathematical model is based on a cumulative distribution function of the channel parameters detected in the channel when the channel is in use by the primary user of the channel, and a complementary cumulative distribution function of the channel parameters detected in the channel when the channel is not in use by the primary user of the channel.

7. The method of claim 3, wherein the out-band threshold is determined based on a cumulative distribution function of channel parameters detected in a channel when the channel is in use by a primary user of the channel and a complementary cumulative distribution function of the channel parameters detected in the channel when the channel is not in use by the primary user of the channel.

8. The method of claim 1, wherein the first set of parameters includes at least one of energy, PHY errors, a cyclic redundancy checking, check sum errors, medium access control addresses and Internet protocol addresses.

9. The method of claim 1, wherein the second set of parameters includes at least one of energy, PHY errors, a cyclic redundancy checking, check sum errors, medium access control addresses and Internet protocol addresses.

10. The method of claim 1, wherein said step of establishing the second communication link includes the steps of sending a management frame from the first communication device to the second communication device through the first channel, the management frame including a list of channels available for switching communication thereto; and establishing the second communication link through the second channel, the second channel being one of the channels in the list of channels.

11. The method of claim 10, wherein the management frame includes a bitmap, the list of channels being included in the bitmap.

12. The method of claim 11, wherein the bitmap includes a bitmap vector, the list of channels being included in the bitmap vector, the bitmap vector including an indication for each of the channels in the list of channels whether it is available for switching communication thereto.

13. The method of claim 10, wherein said step of establishing the second communication link includes the step of receiving a response message at the first communication device from the second communication, the response message including a selection made by the second communication device on the list of channels.

14. The method of claim 13, wherein said step of establishing the second communication link includes the step of sending an acknowledgement message from the first communication device to the second communication device confirming the selection made by the second communication device.

15. The method of claim 1, wherein said step of establishing the second communication link includes the steps of initiating a channel switching operation, said initiating step including the step of directing data transmitted from an upper layer of a communication protocol of the first communication device to a buffer for storage therein; completing the channel switching operation by establishing the second communication link between the first and second communication devices through the second channel; and transmitting the data stored in the buffer to the second communication device upon completing said completing step.

16. The method of claim 15, wherein said directing step is performed continuously from the initiation of said initiating step until the completion of said completing step.

17. The method of claim 15, wherein said directing step includes the step of creating the buffer in a MAC layer of the first communication device.

18. The method of claim 15, wherein the data stored in the buffer is transmitted to the second communication device through the second channel.

* * * * *